G. W. BINGHAM.
SHUTTER.
APPLICATION FILED SEPT. 17, 1910.
1,068,208.
Patented July 22, 1913.
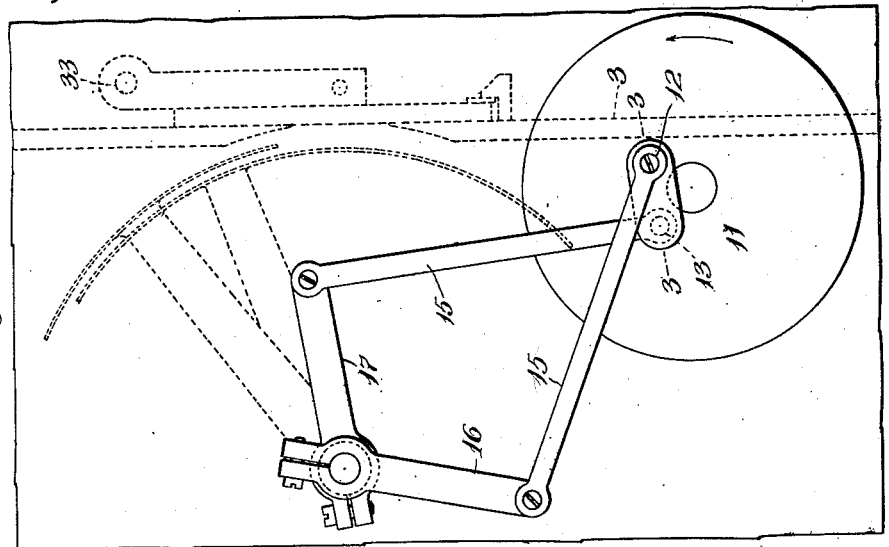
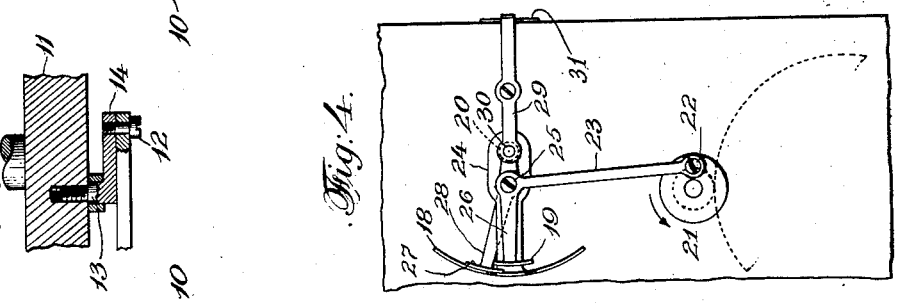
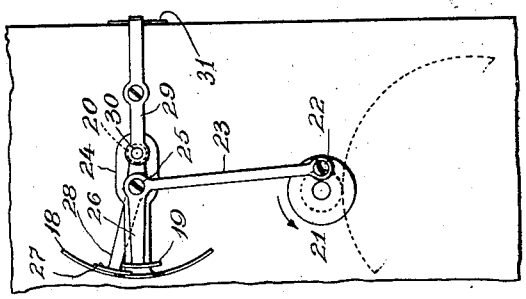
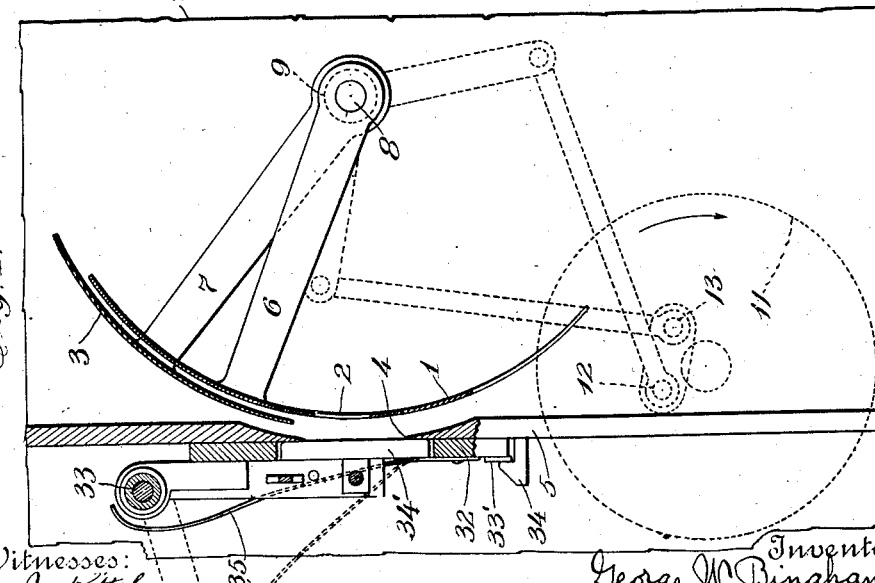
Witnesses:
John J. Kittel
Teresa V. Lynch
Inventor
George W. Bingham.
By his Attorneys
Brock Beeken + Smith

UNITED STATES PATENT OFFICE.

GEORGE W. BINGHAM, OF NEW YORK, N. Y., ASSIGNOR TO THE BINGHAM MANUFACTURING COMPANY, A CORPORATION OF MAINE.

SHUTTER.

1,068,208.  Specification of Letters Patent.  Patented July 22, 1913.

Application filed September 17, 1910. Serial No. 582,528.

*To all whom it may concern:*

Be it known that I, GEORGE W. BINGHAM, a citizen of the United States, and a resident of the borough of Brooklyn, New York city, in the county of Kings and State of New York, have invented certain new and useful Improvements in Shutters, of which the following is a specification.

My invention relates to improvements in shutters generally, and in particular to a shutter for moving picture cameras.

The principal object of my invention is to secure with the moving picture camera, a more clear cut picture than it has heretofore been possible to obtain.

It is a well known fact that in taking pictures of objects moving at a high rate of speed, the images in the individual pictures are frequently more or less blurred. It is to the curing of this defect my invention is particularly directed.

I have found in my experience that better results are obtained and that a perfect image of a swiftly moving object may be secured if the exposure is made gradually, instead of all at once as is the customary practice. Accordingly, my invention consists in utilizing a shutter provided with a light aperture therein, and moving the said shutter past the exposure opening of the camera so that all portions of the sensitized film framed in said exposure opening will be progressively exposed. The shutter is usually in the form of an oscillatory blade having a horizontally disposed slot therein, forming the light aperture, and in connection with this blade some means are preferably employed for closing the light aperture during one of the oscillatory movements of the main shutter blade. If desired, the main shutter blade may be moved first downward to expose one picture and then upward to expose the next picture, but preferably in order to obtain greater speed and regularity in action, the exposure is made only upon one stroke, usually the downward stroke of the shutter, and means, as above referred to, are provided to close the light aperture in the main shutter blade upon the upward or idle movement of the shutter. This light aperture closing means is preferably in the form of a supplementary shutter blade which acts to open the light aperture on one stroke of the main shutter blade and to close the aperture upon the other stroke of the blade.

Another object of my invention is to make the shutter adaptable to varying light conditions, and this I accomplish by providing means for adjusting the size of the light aperture in the main shutter blade.

Various other objects and features of my invention will appear as the specification proceeds.

In the accompanying drawings are illustrated several preferred embodiments of my invention, but it will be understood that various changes and modifications may be made therein without departing from the spirit and scope of the invention. And also it will be understood that while the invention is particularly adapted to moving picture cameras and has been illustrated in such a connection, the invention may be adapted to such other uses as may be found practicable.

In the drawings: Figure 1 is a side elevation with parts in section of my improved shutter mechanism as applied to a moving picture camera, only so much of the camera being shown as is necessary to illustrate the application of the shutter thereto. Fig. 2 is a side elevation of the same looking from the other side from that shown in Fig. 1. Fig. 3 is a broken detail sectional view taken on the line 3—3 of Fig. 2. Fig. 4 is a side elevation of a slightly modified form of the invention in which means are provided for regulating the size of the light aperture in the main shutter blade.

Like reference characters denote corresponding parts throughout the several views.

In its preferred form, the invention consists in its essential elements, of a main shutter blade 1, provided with a light aperture 2 therein, usually in the form of a horizontally extending slot, as shown, and means for alternately opening and closing the said light aperture, preferably in the form of a supplementary shutter 3. These two shutters, or shutter blades as they may more properly be termed, are preferably mounted so as to be capable of an oscillatory or swinging movement in front of the exposure opening 4, of the machine (which exposure opening may be located in the member or wall 5). The main and supplementary shutter blades are therefore preferably carried by a pair of swinging arms 6 and 7 respectively. In order that the shutter blades shall have a coöperative action, these shutter arms are preferably pivoted to swing from the same center. This result is conveniently accomplished by making the pivot support for one shutter arm (the main shutter arm in the drawings) in the form of a shaft 8, and the support for the other arm a tubular shaft 9 surrounding the first shaft, both of these pivot supports being journaled in a suitable support such as the wall 10, a portion only of which is shown in the drawings.

The particular means for operating the shutter may vary, but preferably it will consist, as shown, of a rotary member 11 carrying two crank pins 12 and 13, which by suitable connections impart the proper movement to the shutter blades. These two crank pins are radially offset from one another so that one is located in advance of the other. One way of doing this is by making one of the crank pins (13 in the drawings) fast to the rotary member and providing this so-called fixed crank pin with a lateral offset 14, which carries the other or floating crank pin (12). As a means of connection between these crank pins and the shutter blades, the links 15, may be used, which are connected at one end to the crank pins and at the other end with the rocker arms 16 and 17, which are secured to the pivot supports of the main shutter blade and supplementary shutter blade respectively.

From the foregoing it will be evident that the operation of the parts is such that upon the downward movement of the main shutter blade, the light aperture will be opened so as to effect an exposure, while upon the upward movement of this shutter blade, the light aperture will be closed, so that no exposure will take place. (During the up stroke of the main shutter blade when the light aperture is closed, the film may be advanced in readiness for the next picture.) This operation will be clear from Fig. 1, from which it will be seen that as the rotary member revolves in the direction indicated, the movement of the crank pins is such as to impart to both shutter blades (by means of connections 15—16, 15—17) a downward movement, the leading edge of the supplementary shutter blade trailing in rear of the edge of the light aperture. Exposure is thus made. The forward crank pin (13) is the one which imparts movement to the main shutter blade, so that the main shutter blade will therefore finish its downward stroke and commence on the upward stroke, while the supplementary shutter blade is still moving downward. The supplementary shutter blade thus lags behind the main shutter blade in such a way as to keep the light aperture closed during the whole of the upward stroke of the main shutter blade. Another way of obtaining this opening and closing movement of the light aperture in the main shutter blade is illustrated in Fig. 4, wherein 18 indicates the main shutter blade and 19 the supplementary shutter blade, the main shutter blade being pivoted on the center 20 (shown in dotted lines). The means for imparting the oscillatory movement to the shutter consists of a crank disk 21 carrying a crank pin 22, and a link 23 having connection with the shutter arm 24 by means of the wrist pin 25. In this case the supplementary shutter blade is carried by an arm 26 which virtually forms an angular extension of the connecting rod 23. As the crank disk rotates in the direction of the arrow, it will be clear that upon the upward movement of the crank pin, the main shutter will be moved upward with the supplementary shutter, covering the light aperture therein. As the crank pin swings over at the top past the vertical center line, the supplementary shutter will be shifted to uncover the light aperture, and it will remain so during the down stroke of the main shutter blade. As the crank pin finishes its descent and moves over past the vertical center line at the bottom, the supplementary shutter will be moved to cover the light aperture and will remain so during the up stroke of the shutter. I have also illustrated in Fig. 4 one form of means for regulating the light aperture in the main shutter blade to suit varying conditions, the said means consisting of an aperture closing blade 27, which is carried by an arm 28 and may be moved to regulate the size of the light aperture as desired. This arm 28 which carries the aperture closing blade may be conveniently pivoted upon the wrist pin 25, and to the rearwardly extended end of said arm there may be connected an adjusting member, shown in the form of a pivoted arm 29. The connection between the pivoted arm 29 and the arm 28 may be made by means of a pin 30 which is preferably located in alinement with the center of support (20) of the shutter itself. It will be evident from this that the size of the light aperture may be regulated at will, regardless of whether the shutter is stationary or in operation. The forward end of this adjusting arm 29 may be caused to register on a scale plate 31, so that the relative position of the aperture closing blade may be ascertained at a glance.

For the purpose of holding the film in proper relation to the exposure opening, I preferably use a clamp of some sort, such as the door 32, pivoted to swing from the center 33 and held closed by means of a latch 33' and keeper 34. In order that the optical axis of the machine will not be obscured during the focusing operation, this door is preferably provided with a gateway or hinged section 34' which, as shown in dotted lines in Fig. 1, may be swung up out of alinement with the exposure opening. A spring or like holding device 35 may be used to hold the hinged section in its uppermost position, and this same spring may, if desired, be used to hold this hinged section when in its lowermost position, so as to exert a proper tension upon the film.

What is claimed, is:

1. The combination, in a machine of the character set forth, said machine being provided with an exposure opening, of a shutter associated with said exposure opening, the said shutter having a light aperture therein, means for oscillating the shutter in front of the exposure opening, and means for alternately opening and closing the light aperture in the shutter.

2. A shutter for moving picture machines comprising a main shutter blade having a light aperture therein, means for oscillating said shutter blade past the exposure opening of the machine, a supplementary shutter associated with the main shutter blade, and means for operating said supplementary shutter to close the aperture in the main shutter blade while the same is moving in one direction and to uncover said aperture while the main shutter blade is moving in the opposite direction.

3. A shutter for moving picture machines comprising a main shutter blade having a light aperture therein, means for oscillating said shutter blade past the exposure opening of the machine, means for regulating the size of the light aperture during and independent of the movement of the main shutter blade, a supplementary shutter, and means for operating said supplementary shutter to close the aperture in the main shutter blade while the same is moving in one direction and to uncover said aperture while the main shutter is moving in the opposite direction.

4. A shutter for moving picture machines comprising a pivotally mounted shutter arm, a shutter blade carried thereby and provided with a light aperture, a blade for adjusting the size of the light aperture, carried by the shutter arm, and means for adjusting said blade with respect to the shutter, the said means having a movable connection in line with the pivot mounting of the shutter arm.

5. In a moving picture machine, a pivoted shutter arm, an apertured shutter blade carried thereby, a lever pivotally mounted on the shutter arm, an aperture-regulating blade carried by said lever; and a positioning member having connection with the lever at a point in line with the pivotal support of the shutter arm.

6. In a moving picture machine provided with an exposure opening, a shutter having a light aperture therein, means for oscillating said shutter to carry the light aperture therein past the exposure opening, and means for adjusting the size of the light aperture in the shutter while it is moving past the exposure opening.

7. A shutter for moving picture machines comprising a pair of oscillating shutter blades having their edges spaced apart to provide a light aperture between them, said shutter blades being mounted to move in unison in the same direction, and means for adjusting the shutter blades with respect to each other to vary the size of the light aperture.

8. A shutter for moving picture machines comprising a pair of oscillating shutter blades mounted for bodily movement about the same center and having their edges spaced apart to provide a light aperture between them, means for moving the blades about the center of support, and means for adjusting the shutter blades with respect to each other to vary the size of the light aperture irrespective and independent of the bodily movement about the center of support.

9. In combination with a moving picture machine provided with an exposure opening, a shutter comprising a pair of shutter blades with their adjacent edges spaced apart to constitute a light aperture therebetween, means for bodily vibrating the shutter blades to carry the light aperture past the exposure opening.

Signed at New York city, in the county of New York and State of New York this 16th day of September A. D., 1910.

GEORGE W. BINGHAM.

Witnesses:
 PHILIP S. McLEAN,
 LUCY M. HUGGINS.